Figure 1:
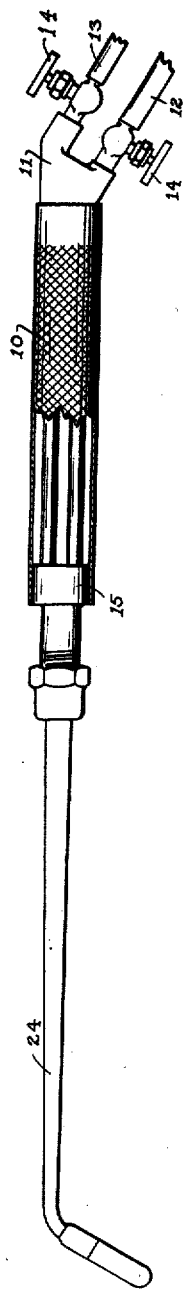

Jan. 8, 1924.

J. W. JOHNSON ET AL
ACETYLENE TORCH INJECTOR
Filed Feb. 13, 1922

1,479,815

INVENTOR.
John W. Johnson
Richard Mieritz
BY
Morsell & Keeney
ATTORNEYS.

Patented Jan. 8, 1924.

1,479,815

UNITED STATES PATENT OFFICE.

JOHN W. JOHNSON AND RICHARD MIERITZ, OF MILWAUKEE, WISCONSIN.

ACETYLENE-TORCH INJECTOR.

Application filed February 13, 1922. Serial No. 536,272.

*To all whom it may concern:*

Be it known that we, JOHN W. JOHNSON and RICHARD MIERITZ, citizens of the United States, and residents of Milwaukee, in the county of Milwaukee and State of Wisconsin, have invented new and useful Improvements in Acetylene-Torch Injectors, of which the following is a description, reference being had to the accompanying drawings, which are a part of this specification.

This invention relates to improvements in acetylene torch injectors, and more particularly to means for mixing the air and gas to form an efficient mixture.

An object of this invention is to so construct the torch that the outer or delivery nozzle of the same may be revolvably secured to the torch handle and may also be readily removed and replaced with delivery nozzles of different sizes when the occasion demands.

Heretofore in acetylene torches difficulty has been experienced in efficiently mixing the air and gas without the necessity of a complicated structure, and to this end an advantage of this invention resides in the simplicity of construction wherein an efficient mixture of the gas and air is accomplished with an elimination of numerous parts.

Heretofore it has also been found desirable to turn the delivery nozzle so that welding might be done beneath a surface as well as on the top of the same, and in this connection the present invention provides means for connecting the delivery nozzle of the torch to the handle portion thereof so that the same may be turned to any desired position relatively to the handle.

It has also been found desirable to replace the delivery nozzle with nozzles of graduated sizes, and to this end the invention contemplates means for connecting a delivery nozzle to the handle of the torch so that the nozzle may be quickly and efficiently removed and replaced by nozzles of various sizes.

In the accompanying specification and drawings, one physical embodiment of this invention will be described and illustrated; and the advantages of this construction will be at once apparent to those skilled in this particular art.

In the drawings:—

Figure 2:
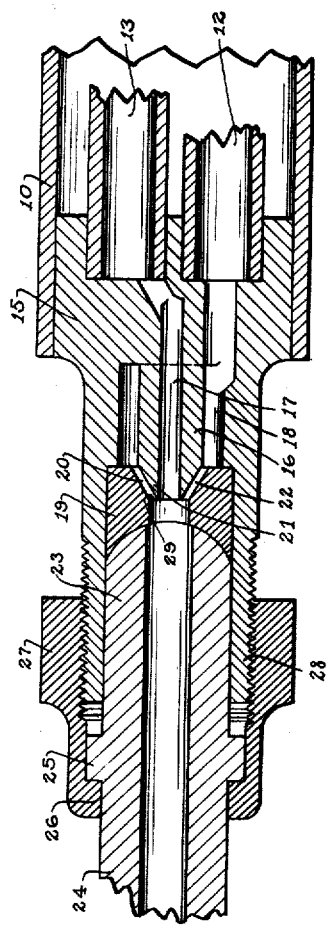

Figure 1 is a side elevation of a torch constructed in accordance with this invention, a portion of the same being broken away to show the interior construction; and Fig. 2 is an enlarged sectional detail view of the same.

In the drawings, wherein like reference numerals refer to like parts, the reference character 10 represents a handle to which is connected at one end a union or sleeve 11. Connected to this union 11 is a gas supply pipe or tube 12 and an air supply pipe or tube 13. Valves 14 are provided for controlling the supply of the respective fluids.

The pipes 12 and 13 extend through the handle 10 and are connected at their forward end to a mixing member 15, the enlarged end of which fits within the handle 10, as clearly illustrated in the drawings. Mixing member 15 is formed with a centrally disposed nozzle 16, the passageway 17 of which communicates with the air supply pipe 13. The mixing member 15 is further formed with a chamber 18 which surrounds the nozzle 16. This chamber 18 communicates with the gas supply pipe 12.

The walls of the chamber 18 at the forward end thereof are cut away to receive a filler member 19 provided with a tapered recess 20 in its rear wall. This tapered recess is slightly larger than the tapered end 21 of the nozzle 16, thereby forming a tapering chamber 22 continuous with the chamber 18 of the mixing member. Thus the air flowing through the nozzle 16 is caused to become intimately mixed, at the discharge end of the nozzle, with the gas flowing through the chamber 18. This necessarily occurs because of the tapering of the chamber adjacent the discharge end of the nozzle 16, this tapered chamber forming a restricted orifice 29 immediately adjacent the discharge end of the nozzle 16.

One face of the filler member 19 is dished to receive the rear end 23 of a nozzle 24. This nozzle is formed with a circular projection or collar 25 which co-operates with a restricted throat or ledge 26 formed on an extension of a clamping nut 27. To accommodate the nut 27, the end of the mixing member 15 is threaded as indicated at 28.

Obviously by tightening the nut 27 the throat or ledge 26 formed integrally therewith will be caused to engage the collar 25 of the delivery nozzle 24, and hold the same tight against the filler member 19. Because of this connection the delivery nozzle 24 may be rotated so that its angularly bent end may be disposed in any radial position relatively to the handle 10, thereby facilitating welding beneath a surface as well as on the top thereof. It will be also obvious that delivery nozzles of graduated sizes may replace the delivery nozzle shown in the drawing.

By reason of the construction of the mixing member the gas and air are delivered to the delivery nozzle thoroughly and efficiently mixed, and the utility of the torch greatly increased.

It is obvious that various modifications in the specific form of this invention may be resorted to without departing from the spirit and scope thereof, and to this end reservation is made to make such changes in the construction as may come within the purview of the accompanying claim.

What is claimed is:

An acetylene torch having in combination a gas supply pipe, an air supply pipe, a handle through which said pipes pass, a mixing member secured to one end of said handle, said member being formed with a nozzle connected to said air supply pipe and a chamber surrounding said nozzle and connected to said gas supply pipe, said nozzle projecting through said chamber and terminating adjacent one end thereof, a filler member disposed in said chamber provided with a recess tapered to form a restricted orifice which immediately surrounds the end of said nozzle, thereby intermixing said gas and air during the delivery of the same, an outer delivery nozzle formed with an annular shoulder adjacent one end thereof, a draw nut formed with an inwardly extending projection engaging said shoulder, and screw threads on the outer end of said mixing member for receiving said draw nut, whereby said delivery nozzle is rotatably and detachably secured in place.

In testimony whereof, we affix our signatures.

JOHN W. JOHNSON.
RICHARD MIERITZ.